Feb. 9, 1965 P. B. FONDEN ETAL 3,169,002
DEVICE FOR BRAKING LANDING AIRCRAFT
Filed July 9, 1962 7 Sheets-Sheet 2

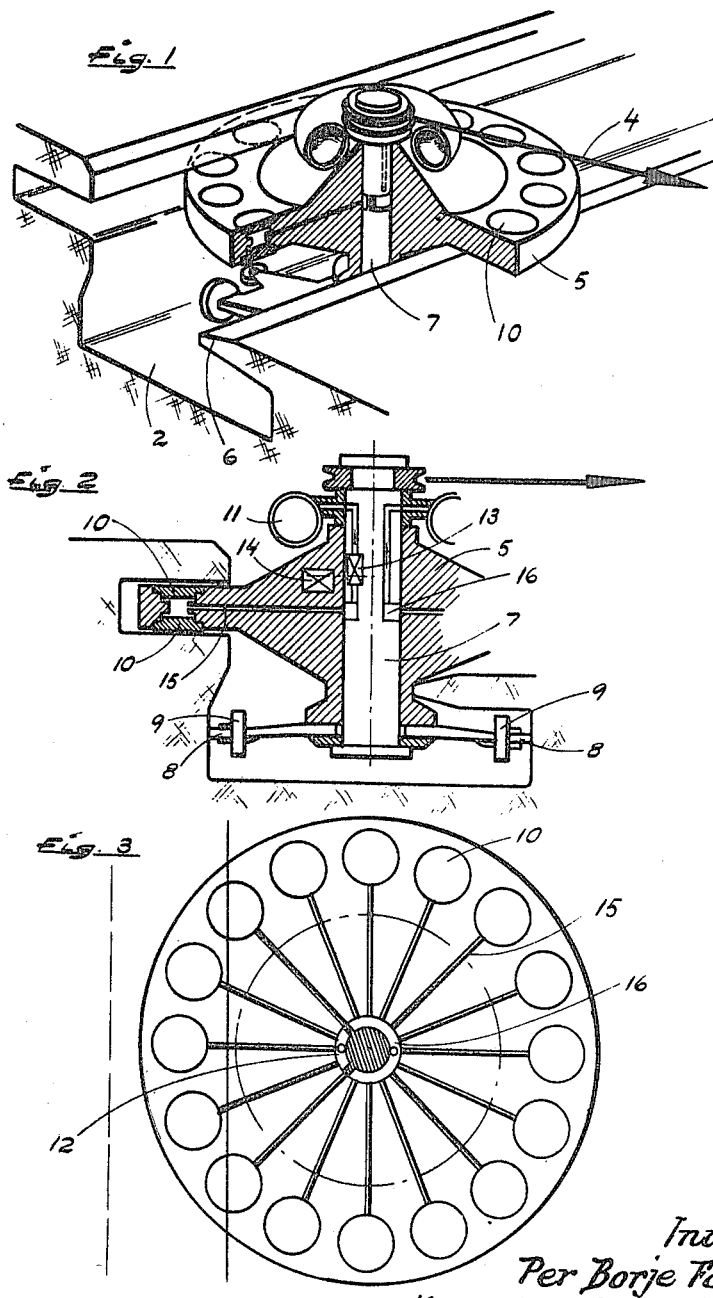

Inventors:
Per Borje Fonden &
Karl Ove Torgny Walander
by
Attorney

Inventors:
Per Börje Fonden &
Karl Ove Torgny Walander
by
Attorney

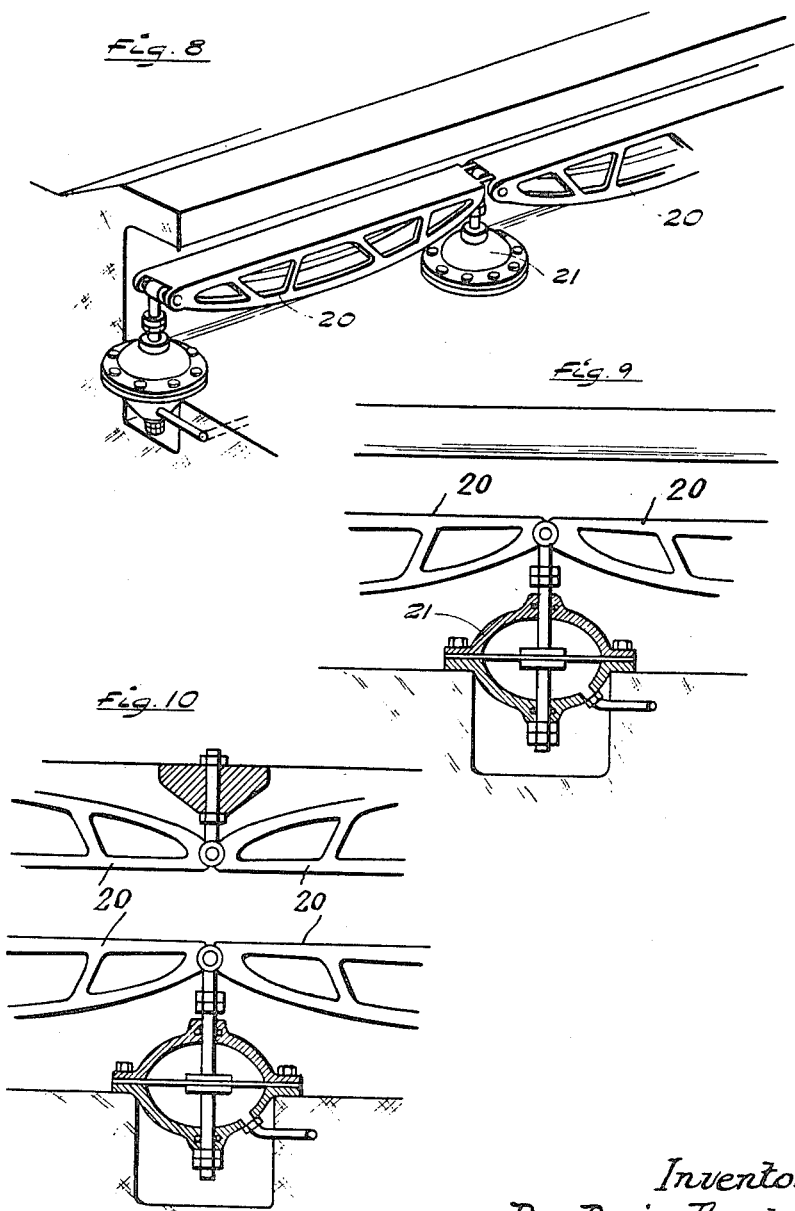

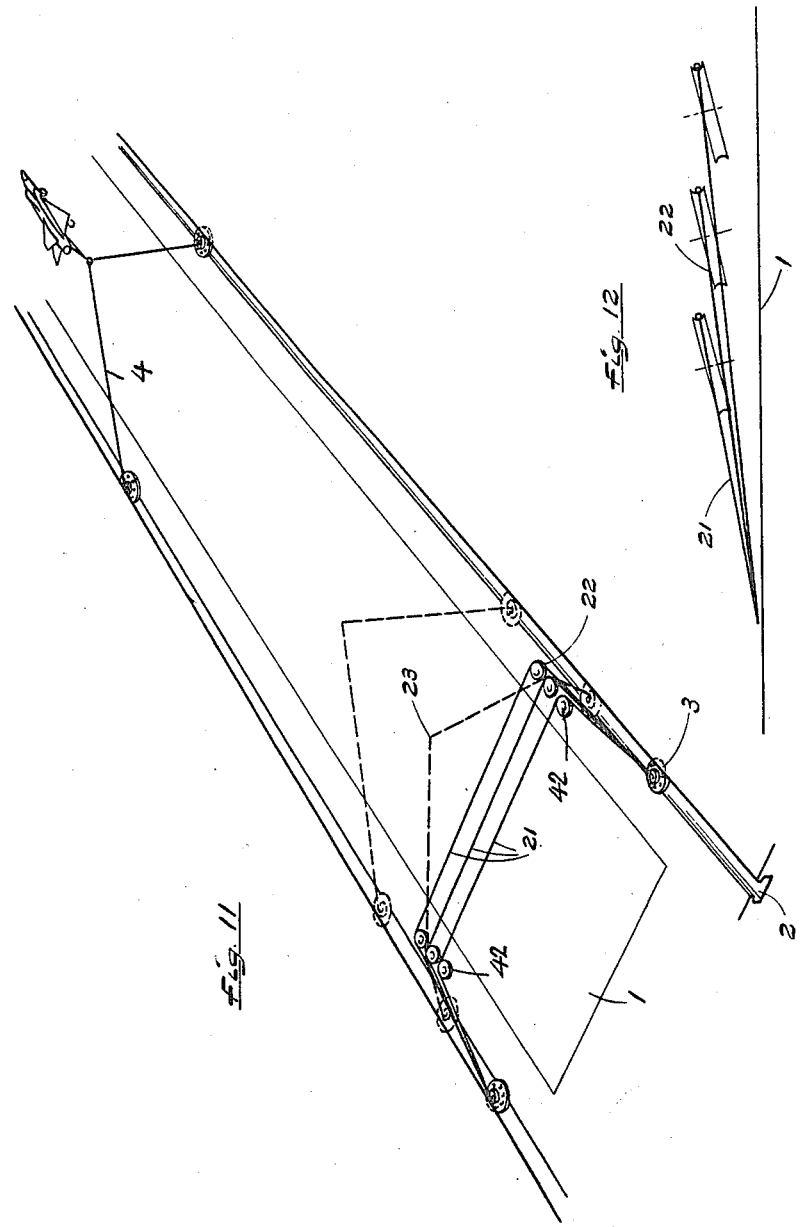

Feb. 9, 1965 P. B. FONDEN ETAL 3,169,002
DEVICE FOR BRAKING LANDING AIRCRAFT
Filed July 9, 1962 7 Sheets-Sheet 6
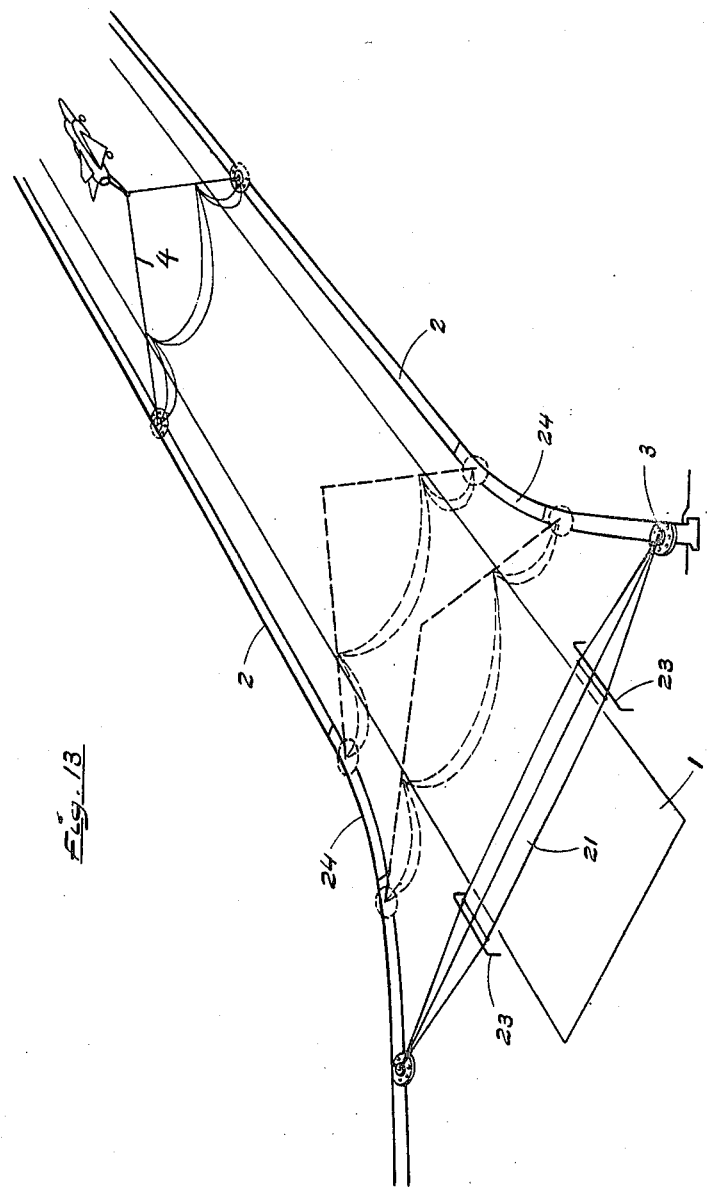
Inventors:
Per Borje Fonden &
Karl Ove Torgny Walander
by
Attorney

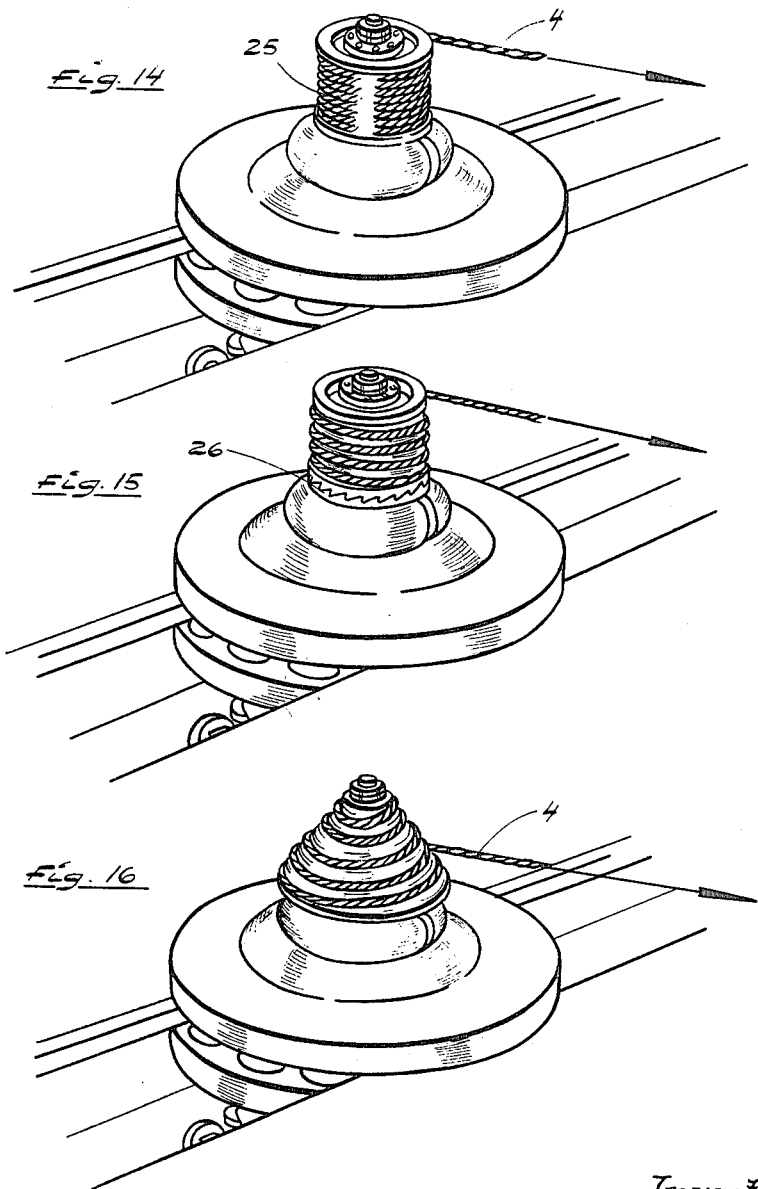

3,169,002
DEVICE FOR BRAKING LANDING AIRCRAFT
Per Borje Fonden, Hejdegatan 3, and Karl Ove Torgny Walander, Vasavagen 49, both of Linkoping, Sweden
Filed July 9, 1962, Ser. No. 208,268
Claims priority, application Sweden, July 10, 1961, 7,174/61
6 Claims. (Cl. 244—110)

This invention relates to a device for braking a landing aircraft by means of ropes, nets or the like attached to braking devices at both ends.

The invention is characterized primarily by the fact that it includes braking devices which are designed to travel in channels extending along both sides of the runway while the braking takes place. The braking devices are pulled along by the aircraft after it touches down. The necessary braking effect is developed as the braking devices frictionally engage against the sides of the channels. A catcher device, comprising for example, one or more ropes, is positioned across the runway to engage a hook which is extended downwardly from the rear of the aircraft. In addition, devices are provided which gently accelerate the braking devices up to the speed of the landing aircraft, and devices which gently apply the braking effect. Moreover, the braking effect can be discontinued when the aircraft speed drops to the particular rate at which the plane can be taxied to the parking apron in the usual manner.

Although the invention can be used for other purposes, it is primarily intended for use upon military landing strips and at airports where the runway length is limited and aircraft must be landed and braked in rapid sequence. It is one of the objects of the invention to provide means by which rapid-sequence landing is possible since the device can be fitted into the channels and connected to the catcher device, either ropes or net, very quickly. The catcher devices can be readied prior to landing operations and can be positioned individually as the airplanes land. As soon as the aircraft engages one catcher device and pulls it forward along with the braking devices, another can be positioned. Thus, theoretically, there is no limit as to the number of planes which can be braked. In practice, the only limiting factor is the number of braking devices available as well as the number of catcher devices and the speed with which they can be returned to service after each use.

It is therefore an object of the invention to provide an aircraft braking means which will not only very effectively brake a landing airplane, but which will permit of rapid sequence landing.

With the above and other objects to be hereinafter set forth in view, I have devised the arrangement of parts to be described and more particularly pointed out in the claims appended hereto.

In the accompanying drawings, wherein an illustrative embodiment of the invention is disclosed, FIGS. 1 to 10 show perspective views and sectional views of several examples of braking devices and channels extending alongside an airplane runway;

FIGS. 11 and 12 show channels supplemented with pulleys mounted in the runway for the catcher device;

FIG. 13 shows channels which diverge at one end of the runway, and

Figure 4:
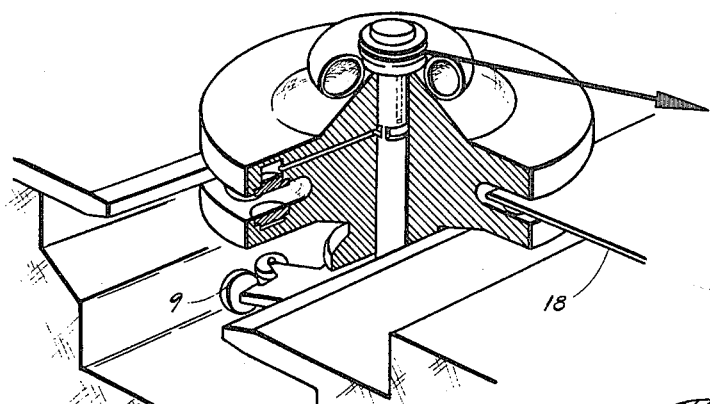

FIGS. 14 to 16 inclusive show braking devices equipped with drums.

In FIGS. 11 and 13, the runway is designated at 1. Extending along each side of the runway are channels 2 for the braking devices 3 to which a catcher device, which may be a rope 4, is attached. The channels 2, due to the high loads encountered, may be constructed of armored concrete. Theoretically, a rectangular ditch design with guides, suffices for the channel, but significant advantages are gained if the channels are designed as illustrated in the drawings. Such design permits braking devices to include one or more wheels 5 (FIG. 1) rather than blocks pressed by mechanical spring pressure, hydraulic pressure or pneumatic pressure against the channel sides. These wheels 5 are positioned horizontally in the channels so that they roll against the channel side 6 adjacent to the runway 1 while braking action takes place against braking surfaces on the opposite sides of the channel. The drawings show that the wearing surface 6 on the runway side of the channel is much closer to the center of the wheel than the braking surfaces. This fact results in a very high ratio of the braking effect to the pressure acting as load on the channel itself. Moreover, advantages inherent in disc brakes are attained, that is, a significant heat dissipation from the braking surfaces due to radiation during part of each revolution of the wheel.

In the embodiment of the invention shown in FIGS. 1 to 3, the rope 4 is attached to the wheel 5 at the non-rotating shaft 7 which is mounted on the horizontal wheel 8 at its bottom, and which positions the braking device in the channel. The wheels 5 are rotative on bearings 55 and 56 shown in FIG. 5. Vertical wheels 9 permit the braking device to be pulled along by the aircraft after the braking device is pulled from the channel.

Figure 5A:
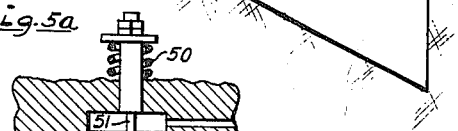
Figure 5B:
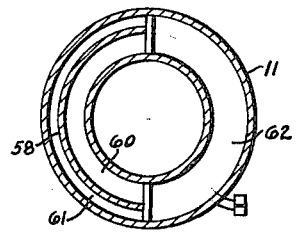

Brake shoes or inserts 10 located around the wheel 5 are adapted to be pressed into contact with the channel. These brake shoes are actuated either hydraulically or pneumatically so that pressure is brought to bear only when the shoes are in actual contact with the channel braking surfaces. As shown in FIG. 5a, the upper brake shoe 10a is maintained in raised or released position by means of springs 50, one of which is shown, and which encircles a pin 51 secured to the brake shoe 10a. Pressure medium from a tank 11 is fed to an admission chamber 12 provided in the shaft 7, through a valve 13 which is controlled by a centrifugal regulator 14, so that when the rotative speed of the wheel 5 drops to a particular value the supply of the pressure medium will be shut off so that the aircraft can then pull the braking device out of the channel by the power of the aircraft, and it can taxi to the parking apron.

Figure 5:
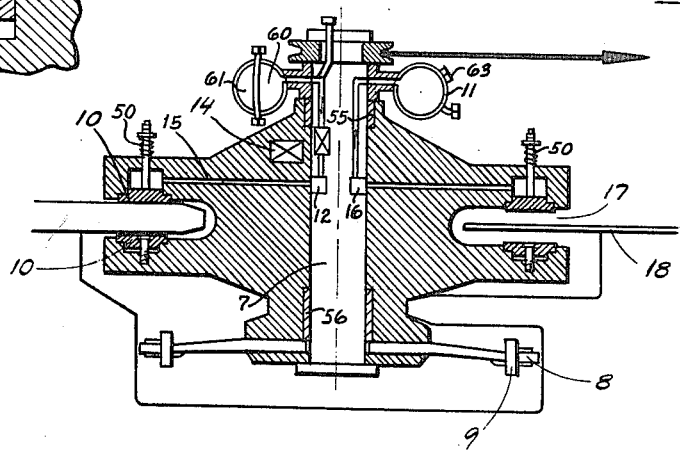

The spaces between the top and bottom brake shoes 10 are successively connected to the admission chamber 12 and a discharge chamber 16 in shaft 7 via the channels 15. Thus, the brake shoes 10 are supplied with pressure medium only while they are located in the channels between braking surfaces thereof. Since the pressure medium is supplied through flow chokes in channels and in the valve, the braking pressure is applied gently. The spaces behind the movable brake shoes 10a are connected by means of channels 57 successively with the chamber 12 and a discharge chamber 16 (FIG. 5). The tank 11 is divided by a diaphragm 58 into two halves, thus providing an inner space 60 for the pressure fluid, and an outer space 61 for the pressure air, and which latter space serves as an air accumulator to maintain the fluid pressure. The fluids are conducted through the chamber 12 and discharged from the chamber 16 to the right hand space 62 in the tank 11, which space is under atmospheric pressure. A valve 63 is provided for discharging the fluid and which valve opens if the pressure becomes too low in the space 62.

In the arrangement shown in FIGS. 4 and 5, a circular groove 17 is provided in the perimeter of the wheel. A projection on the edge of the channel extends into this circular groove, and the brake shoes 10 are pressed against the projection to provide the required braking effect. Since the channel is not exposed to high bursting stress as is the design shown in FIGS. 1 to 3, smaller channel dimensions can be used. To improve wheel cooling the projection on the runway side of the channel is provided with a cooling fin 18 extending into the groove 17 as shown in FIG. 5. Heat generated by the brake shoes is largely dissipated by this cooling fin 18. Cooling is facilitated by the fact that the brake shoes are adjacent to the cooling fin for a relatively long period due to their cycloidal motion.

Figure 6:
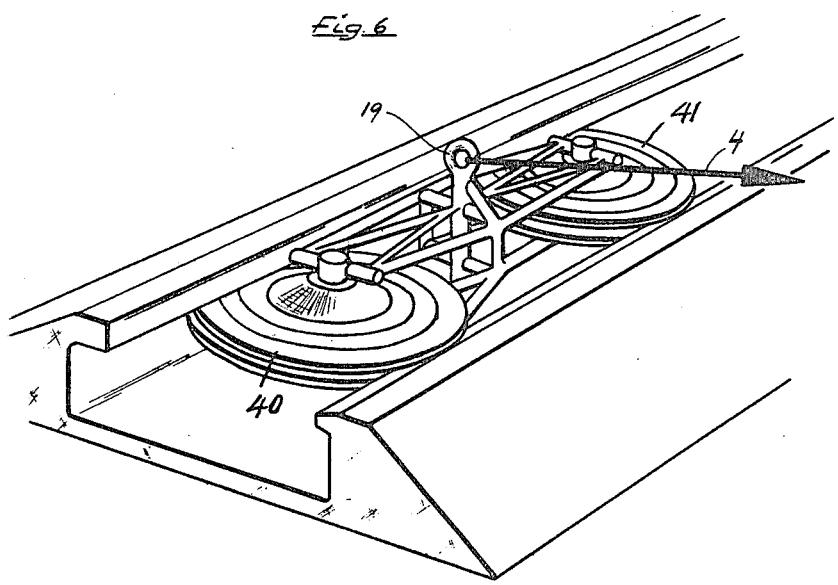
Figure 7:
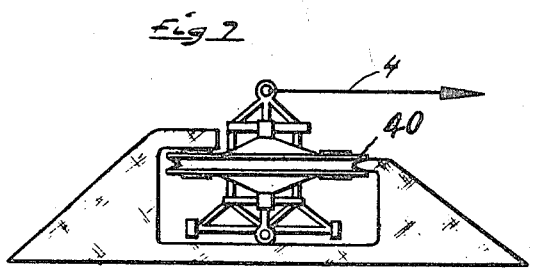

The braking device shown in FIGS. 6 and 7 has two wheels 40 and 41 positioned on either side of a bracket 19 having an eye to which the catcher rope 4 is attached. Braking devices comprising different numbers of wheels can thus be used in the same channel to provide different effects. This fact is important when braking landing aircraft which vary in weight. A braking surface designed as shown in FIG. 7 makes use of the inward pull of the load to achieve braking effect by taking advantage of such pull.

FIGS. 8 and 9 show a channel with one fixed edge and one movable edge, the latter edge consisting of several edge members 20 which are pivotally connected together and are adapted to be urged against the braking means in the channel by the operation of the pressure devices 21. This arrangement permits use of extremely simple braking devices since they need not be equipped with special means such as brake shoes etc. by which braking pressure is applied. The braking pressure can be applied gently and can be varied in accordance with specific requirements and with the length of the channel.

FIG. 10 shows a channel having movable edge members 20 at both sides.

FIGS. 11 and 12 show a catcher device consisting of three ropes stretched across the runway at right angles to the longitudinal axis of the runway. The ropes extend over pulleys 42 and 22 mounted in the runway and both ends of the three ropes are attached to braking devices at either side of the runway. When the hook provided on the aircraft engages any one of these three ropes, the rope is pulled by the plane as shown by the broken line 23 in FIG. 11, causing the braking devices to move a short distance, acquiring an acceleration determined by the geometry of the arrangement and which tests have proved to be particularly suitable.

When the braking device reaches the pulley 22, it will have reached the velocity of the aircraft. The two idle catcher ropes are disengaged from the braking device (not shown in the drawing). After the aircraft is braked, new ropes are inserted in the pulley 22, and all three ropes are attached to new braking devices.

FIG. 13 shows diverging channels which provide the desired braking device accelation. The braking devices are joined by means of three ropes 21 passing over two brackets 23. The channel is straight at the other end of the runway so that the aircraft can pull the braking device from the channel. Since divergent channel curves are needed at the other end if the aircraft should land in the opposite direction, the curved sections of the channel adjacent to the straight sections are designed as separate and removable, insertable sections 24.

Another way of achieving uniform acceleration is shown in FIG. 14. Therein a rope 4 is wound on a helical groove extending around a brake drum 25 mounted on top of the braking device. The braking effect in the drum can be achieved, for example, by pre-setting brake spring pressure so that the braking device 3 accelerates gently until the angle between the rope and the braking device reaches a suitable value. The brake drum can be attached to the braking device so as to prevent it from rotating faster than the braking device, in the same direction, but permitting it to rotate slower than the braking device, i.e. it can be stationary relatively to the braking attachment. At the start, the rope 4 is positioned on the side of the shaft where it will provide a torque which will start the braking attachment rotating correctly.

In FIG. 15 is shown a toothed coupling 26 which acts to rotate in one direction while permitting it to remain at rest when the brake drum is turned in the other direction. FIG. 16 shows a conical drum with the rope 4 positioned so that it feeds out from the base of the cone upwardly, thus reducing the distance of the rope from the axis of rotation to zero after several turns.

From the foregoing, it will be apparent that an apparatus has been disclosed by means of which rapid and effective braking of an aircraft will be had by the frictional engagement of braking means in channels extending along a runway; that such means is effective to apply a gentle but forceful braking effect, and that after the braking of one aircraft, a restoration of the braking means for operation on a successively landing aircraft will be rapid.

Having thus described several embodiments of the invention, it is obvious that the same is not to be restricted thereto, but is broad enough to cover all structures coming within the scope of the annexed claims.

What we claim is:

1. A device for braking landing aircraft comprising channels extending along the opposite sides of a landing runway, a braking device in each channel, a rope or similar flexible element extending across the runway and connected to each of the braking devices, each of said braking devices consisting of a wheel operative against a part of its channel to apply a braking force thereon, the channel having a groove in which the wheel travels, and the wheel having brake shoes which are urged outwardly against the sides of the groove.

2. In a device for braking landing aircraft, a landing runway having a groove, a braking wheel disposed therein, said wheel having a circular groove, the groove of the runway having a projection extending into the groove in the wheel, and the braking device having brake shoes which are pressed inwardly into contact with the projection when braking.

3. A brake for landing aircraft comprising, channels extending along the opposite sides of a landing runway, braking devices travelling in said channels and operative against parts of the same, flexible means extending across the runway and connected to the braking devices and adapted to be engaged by an aircraft as it travels down the runway, each braking device including a brake drum around which the flexible means is wound, and means by which said drum can be adjusted to provide a braking effect operative to accelerate the braking device to a suitable speed.

4. A device as provided for in claim 3 and including a toothed coupling joining the brake drum to the braking device so that the braking device has its wheel operative in one direction only.

5. A device as provided for in claim 4 wherein the drum is conical in shape with the flexible means wound so that it is fed out from the base of the drum unwinding upwardly therefrom.

6. A device for braking landing aircraft by means of ropes, nets and the like attached at both ends to braking devices which travel in upwardly-directed channels extending along the edge of the aircraft runway while providing braking effect, characterized in that the channels receive within them horizontally fitted wheels provided on the braking devices, which wheels roll against one of the channel edges adjacent to the runway while braking action takes place against one or more braking surfaces provided on the opposite channel edge.

References Cited by the Examiner

UNITED STATES PATENTS

| | | | |
|---|---|---|---|
| 1,502,653 | 7/24 | Bassler | 244—110 |
| 2,473,397 | 6/49 | Slavin | 244—110 |
| 2,789,780 | 4/57 | Cotton et al. | 244—110 |
| 2,814,365 | 11/57 | Snow | 244—110 X |
| 2,939,656 | 6/60 | Fulton et al. | 244—110 |
| 2,990,146 | 6/61 | Terry | 244—110 |
| 2,991,850 | 7/61 | Snow | 188—152 X |
| 3,020,010 | 2/62 | Haber | 244—110 |
| 3,057,440 | 10/62 | Broudo | 244—110 |

MILTON BUCHLER, *Primary Examiner.*

ANDREW H. FARRELL, *Examiner.*